(12) United States Patent
Yashiki

(10) Patent No.: US 10,573,867 B2
(45) Date of Patent: Feb. 25, 2020

(54) METHOD FOR PRODUCING NONAQUEOUS ELECTROLYTE SECONDARY BATTERY SEPARATOR

(71) Applicant: Sumitomo Chemical Company, Limited, Tokyo (JP)

(72) Inventor: Daizaburo Yashiki, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 16/451,775

(22) Filed: Jun. 25, 2019

(65) Prior Publication Data

US 2019/0319241 A1 Oct. 17, 2019

Related U.S. Application Data

(62) Division of application No. 15/360,396, filed on Nov. 23, 2016.

(30) Foreign Application Priority Data

Nov. 30, 2015 (JP) .................................. 2015-233930

(51) Int. Cl.
| | | |
|---|---|---|
| *H01M 2/16* | (2006.01) | |
| *B29C 55/04* | (2006.01) | |
| *H01M 10/0525* | (2010.01) | |
| *B29C 55/02* | (2006.01) | |
| *H01M 10/05* | (2010.01) | |
| *H01M 2/14* | (2006.01) | |
| *B29C 67/20* | (2006.01) | |
| *B29C 53/00* | (2006.01) | |
| *B29C 48/00* | (2019.01) | |
| *B29C 48/08* | (2019.01) | |
| *B29K 105/04* | (2006.01) | |
| *B29K 23/00* | (2006.01) | |
| *B29L 31/34* | (2006.01) | |

(52) U.S. Cl.
CPC ....... *H01M 2/1653* (2013.01); *B29C 48/0019* (2019.02); *B29C 53/005* (2013.01); *B29C 55/02* (2013.01); *B29C 55/04* (2013.01); *B29C 67/202* (2013.01); *H01M 2/145* (2013.01); *H01M 2/1686* (2013.01); *H01M 10/05* (2013.01); *H01M 10/0525* (2013.01); *B29C 48/0011* (2019.02); *B29C 48/08* (2019.02); *B29K 2023/00* (2013.01); *B29K 2105/04* (2013.01); *B29K 2995/0065* (2013.01); *B29L 2031/3468* (2013.01); *H01M 2220/20* (2013.01); *H01M 2220/30* (2013.01)

(58) Field of Classification Search
CPC . B29C 48/0019; B29C 48/0011; H01M 2/145
See application file for complete search history.

(56) References Cited

U.S. PATENT DOCUMENTS

| | | |
|---|---|---|
| 4,588,633 A | 5/1986 | Kono et al. |
| 5,385,777 A | 1/1995 | Higuchi et al. |
| 6,245,272 B1 | 6/2001 | Takita et al. |
| 6,447,958 B1 | 9/2002 | Shinohara et al. |
| 6,602,593 B1 | 8/2003 | Callahan et al. |
| 7,662,518 B1 | 2/2010 | Samii et al. |
| 2002/0034689 A1 | 3/2002 | Hoshida et al. |
| 2003/0054233 A1 | 3/2003 | Zucker |
| 2004/0180162 A1 | 9/2004 | Gringoire |
| 2006/0228540 A1 | 10/2006 | Lee et al. |
| 2007/0032601 A1 | 2/2007 | Tasaki et al. |
| 2007/0092705 A1 | 4/2007 | Lee et al. |
| 2007/0254209 A1 | 11/2007 | Baba et al. |
| 2009/0079102 A1 | 3/2009 | Takita et al. |
| 2009/0148685 A1 | 6/2009 | Kang et al. |
| 2009/0219672 A1 | 9/2009 | Masuda et al. |
| 2009/0226814 A1 | 9/2009 | Takita et al. |
| 2010/0093965 A1 | 4/2010 | Yamamoto et al. |
| 2010/0099022 A1 | 4/2010 | Nishida et al. |
| 2010/0178544 A1 | 7/2010 | Nishikawa |
| 2010/0248002 A1 | 9/2010 | Takita et al. |
| 2011/0159346 A1 | 6/2011 | Yamamoto et al. |
| 2011/0217584 A1 | 9/2011 | Terakawa et al. |
| 2011/0248670 A1 | 10/2011 | Yamazaki et al. |
| 2011/0262814 A1 | 10/2011 | Ikemoto et al. |
| 2011/0293989 A1 | 12/2011 | Hasegawa et al. |
| 2012/0070644 A1 | 3/2012 | Kang et al. |

(Continued)

FOREIGN PATENT DOCUMENTS

| | | |
|---|---|---|
| CN | 1286502 A | 3/2001 |
| CN | 1294608 A | 5/2001 |

(Continued)

OTHER PUBLICATIONS

Office Action dated Apr. 12, 2016 in JP Application No. 2015-233930.
Office Action dated Nov. 10, 2016 in KR Application No. 10-2016-0064613.
Office Action dated Apr. 12, 2016 in JP Application No. 2015-233934.
Notice of Allowance dated Apr. 28, 2017 in KR Application No. 10-2016-0134943.
Office Action dated Apr. 12, 2017 in KR Application No. 10-2016-0134943.

(Continued)

*Primary Examiner* — Ladan Mohaddes
(74) *Attorney, Agent, or Firm* — Panitch Schwarze Belisario & Nadel LLP

(57) ABSTRACT

A nonaqueous electrolyte secondary battery separator, which includes a porous film containing a polyolefin-based resin as a main component, has a difference of not more than 2.5 between (a) a white index measured on a surface of the porous film which has not been irradiated with ultraviolet light having 255 W/m² and (b) a white index measured on the surface of the porous film which has been irradiated, for 75 hours, with the ultraviolet light having 255 W/m².

10 Claims, 1 Drawing Sheet

(56) References Cited

U.S. PATENT DOCUMENTS

| | | | |
|---|---|---|---|
| 2012/0129034 A1 | 5/2012 | Hasegawa et al. |
| 2012/0231323 A1 | 9/2012 | Takagi et al. |
| 2012/0251869 A1 | 10/2012 | Lee et al. |
| 2012/0268072 A1 | 10/2012 | Okuno |
| 2012/0301698 A1 | 11/2012 | Rhee et al. |
| 2013/0011716 A1 | 1/2013 | Sano et al. |
| 2013/0031922 A1 | 2/2013 | Heyl et al. |
| 2013/0116355 A1 | 5/2013 | Kang et al. |
| 2013/0189587 A1 | 7/2013 | Kikuchi et al. |
| 2013/0280615 A1 | 10/2013 | Imai et al. |
| 2013/0337311 A1 | 12/2013 | Itou |
| 2014/0349168 A1 | 11/2014 | Yashiki et al. |
| 2014/0363726 A1 | 12/2014 | Honda et al. |
| 2014/0377540 A1 | 12/2014 | Ishiguro et al. |
| 2014/0377630 A1 | 12/2014 | Kawakami et al. |
| 2015/0004404 A1 | 1/2015 | Senda et al. |
| 2015/0004466 A1 | 1/2015 | Yashiki et al. |
| 2015/0072142 A1 | 3/2015 | Senda et al. |
| 2015/0155536 A1 | 6/2015 | Suzuki |
| 2015/0228948 A1 | 8/2015 | Maruyama et al. |
| 2015/0372276 A1 | 12/2015 | Mizuno et al. |
| 2016/0336569 A1 | 11/2016 | Mizuno et al. |
| 2017/0025659 A1 | 1/2017 | Suzuki |
| 2017/0125763 A1 | 5/2017 | Inatomi et al. |
| 2017/0149038 A1 | 5/2017 | Miura et al. |

FOREIGN PATENT DOCUMENTS

| | | |
|---|---|---|
| CN | 101038960 A | 9/2007 |
| CN | 101208379 A | 6/2008 |
| CN | 101281961 A | 10/2008 |
| CN | 101622736 A | 1/2010 |
| CN | 102471518 A | 5/2012 |
| CN | 104093775 A | 10/2014 |
| CN | 104241574 A | 12/2014 |
| CN | 104448471 A | 3/2015 |
| JP | S60242035 A | 12/1985 |
| JP | H07188440 A | 7/1995 |
| JP | H09213295 A | 8/1997 |
| JP | H1064501 A | 3/1998 |
| JP | H10-298325 A | 11/1998 |
| JP | H11240970 A | 9/1999 |
| JP | H11300180 A | 11/1999 |
| JP | 2000021233 A | 1/2000 |
| JP | 2000299094 A | 10/2000 |
| JP | 20012812 A | 1/2001 |
| JP | 2001118558 A | 4/2001 |
| JP | 2002069221 A | 3/2002 |
| JP | 3347854 B2 | 11/2002 |
| JP | 2003105120 A | 4/2003 |
| JP | 2005-343937 A | 12/2005 |
| JP | 2008035674 A | 2/2008 |
| JP | 4179830 B2 | 11/2008 |
| JP | 4247027 B2 | 4/2009 |
| JP | 2009070726 A | 4/2009 |
| JP | 2009132904 A | 6/2009 |
| JP | 2009-256404 A | 11/2009 |
| JP | 2010044935 A | 2/2010 |
| JP | 2010111096 A | 5/2010 |
| JP | 2010180341 A | 8/2010 |
| JP | 2010540744 A | 12/2010 |
| JP | 2011516624 A | 5/2011 |
| JP | 2011126275 A | 6/2011 |
| JP | 2011-233245 A | 11/2011 |
| JP | 4867185 B2 | 2/2012 |
| JP | 4957531 B2 | 6/2012 |
| JP | 2012117047 A | 6/2012 |
| JP | 2012227066 A | 11/2012 |
| JP | 5145712 B2 | 2/2013 |
| JP | 2013047600 A | 3/2013 |
| JP | 5206659 B2 | 6/2013 |
| JP | 5213158 B2 | 6/2013 |
| JP | 2013163763 A | 8/2013 |
| JP | 2013-223957 A | 10/2013 |
| JP | 2013225381 A | 10/2013 |
| JP | 5355823 B1 | 11/2013 |
| JP | 2013246918 A | 12/2013 |
| JP | 2014-038771 A | 2/2014 |
| JP | 2014-118515 A | 6/2014 |
| JP | 2014118535 A | 6/2014 |
| JP | 2014-182875 A | 9/2014 |
| JP | 2014181250 A | 9/2014 |
| JP | 5656093 B2 | 1/2015 |
| JP | 2015111598 A | 6/2015 |
| JP | 2015171814 A | 10/2015 |
| JP | 2015201323 A | 11/2015 |
| JP | 6012838 B1 | 10/2016 |
| KR | 19990083447 A | 11/1999 |
| KR | 20060106102 A | 10/2006 |
| KR | 20060118668 A | 11/2006 |
| KR | 20080070664 A | 7/2008 |
| KR | 20090125007 A | 12/2009 |
| KR | 2010-0025568 A | 3/2010 |
| KR | 20110089438 A | 8/2011 |
| KR | 101094603 B1 | 12/2011 |
| KR | 20120120018 A | 11/2012 |
| KR | 101287467 B1 | 7/2013 |
| KR | 101336593 B1 | 12/2013 |
| KR | 20140014304 A | 2/2014 |
| KR | 101394622 B1 | 5/2014 |
| KR | 20140071095 A | 6/2014 |
| KR | 20150048103 A | 5/2015 |
| KR | 101532851 B1 | 7/2015 |
| KR | 20150119836 A | 10/2015 |
| KR | 20160049851 A | 5/2016 |
| WO | 2005028553 A1 | 3/2005 |
| WO | 2008/035674 A1 | 3/2008 |
| WO | 2009044227 A1 | 4/2009 |
| WO | 2013/047600 A1 | 4/2013 |
| WO | 2013054884 A1 | 4/2013 |
| WO | 2015/146733 A1 | 10/2015 |
| WO | 2015156377 A1 | 10/2015 |

OTHER PUBLICATIONS

Office Action dated Oct. 5, 2017 in U.S. Appl. No. 15/297,182, by Okugawa.
Office Action dated Sep. 14, 2017 in CN Application No. 201610912734.6.
Office Action dated Mar. 29, 2016 in JP Application No. 2015-233938.
Office Action dated Aug. 3, 2017 in CN Application No. 201611069601.3.
Office Action dated Nov. 14, 2017 in U.S. Appl. No. 15/363,689, by Takata.
Office Action dated Oct. 11, 2017 in U.S. Appl. No. 15/362,886 by Ozeki.
Office Action dated Oct. 16, 2017 in U.S. Appl. No. 15/360,396 by Yashiki.
Notice of Allowance dated Nov. 7, 2016 in KR Application No. 10-2016-0064506.
Office Action dated Sep. 20, 2016 in JP Application No. 2015-233940.
Office Action dated Jun. 21, 2016 in JP Application No. 2015-233940.
Office Action dated Mar. 29, 2016 in JP Application No. 2015-233940.
Office Action dated Jul. 14, 2016 in KR Application No. 10-2016-0064506.
(Kyoritsu Shuppan Co., Ltd., "Advanced Materials System One Point 5 Advanced Batteries and Materials," Ed. 1, 3 pages (2012) (Partial translation).
Nikkan Kogyo Shimbun, Ltd., "Lithium-Ion Batteries for Hybrid Vehicles," Ed. 1, pp. 142-143 (Mar. 26, 2015) (Partial translation).
Office Action dated Jul. 19, 2016 in KR Application No. 10-2016-0064610.
Allowance dated Nov. 9, 2016 in KR Application No. 10-2016-0064610.
Office Action dated Sep. 8, 2017 in CN Application No. 201611069499.7.

(56) References Cited

OTHER PUBLICATIONS

Office Action dated Sep. 21, 2016 in KR Application No. 10-2016-0082203.
Office Action dated Jan. 17, 2017 in KR Application No. 10-2016-0082203.
Office Action dated Apr. 12, 2016 in JP Application No. 2015-233935.
Office Action dated Jul. 22, 2016 in KR Application No. 10-2016-0064613.
Office Action dated Oct. 19, 2017 in U.S. Appl. No. 15/297,182, by Okugawa.
Office Action dated Dec. 7, 2017 in U.S. Appl. No. 15/362,892, by Hashiwaki.
Office Action dated Dec. 20, 2017 in U.S. Appl. No. 15/362,897, by Ogata.
Office Action dated Nov. 24, 2017 in CN Application No. 201611078498.9.
Nikkan Kogyo Shimbun, Ltd., "Lithium-Ion Batteries for Hybrid Vehicles," Ed. 1, pp. 145-147 (Mar. 26, 2015).
Office Action dated Dec. 14, 2017 in CN Application No. 201611075302.0.
Office Action dated Mar. 13, 2018 in U.S. Appl. No. 15/362,886, by Ozeki.
Office Action dated Mar. 16, 2018 in U.S. Appl. No. 15/360,396, by Yashiki.
Office Action dated Mar. 7, 2018 in U.S. Appl. No. 15/362,897, by Ogata.
Office Action dated Apr. 4, 2018 in U.S. Appl. No. 15/297,182, by Okugawa.
Office Action dated Mar. 19, 2018 in U.S. Appl. No. 15/362,892, by Hashiwaki.
Office Action dated Apr. 12, 2018 in U.S. Appl. No. 15/363,689, by Takata.
Office Action dated Jun. 15, 2018 in CN Application No. 201611075302.0.
Office Action dated Jun. 26, 2018 in U.S. Appl. No. 15/362,897, by Ogata.
Office Action dated Jul. 27, 2018 in U.S. Appl. No. 15/362,886, by Ozeki.
Office Action dated Aug. 27, 2018 in U.S. Appl. No. 15/297,182, by Okugawa.
Office Action dated Aug. 28, 2018 in U.S. Appl. No. 15/360,396, by Yashiki.
Office Action dated Dec. 14, 2018 in U.S. Appl. No. 15/362,897, by Ogata.
Office Action dated Feb. 14, 2019 in U.S. Appl. No. 15/362,886, by Ozeki.
Office Action dated May 31, 2019 in U.S. Appl. No. 15/362,886 by Ozeki.
Office Action dated Apr. 2, 2019 in U.S. Appl. No. 15/360,396 by Yashiki.
Office Action dated Feb. 3, 2019 in CN Application No. 201611075302.0.
Office Action dated Dec. 26, 2018 in U.S. Appl. No. 15/360,396 by Yashiki.
Advisory Action dated Aug. 3, 2018 in U.S. Appl. No. 15/360,396 by Yashiki.
Office Action dated Sep. 28, 2017 in U.S. Appl. No. 15/360,396 by Yashi.

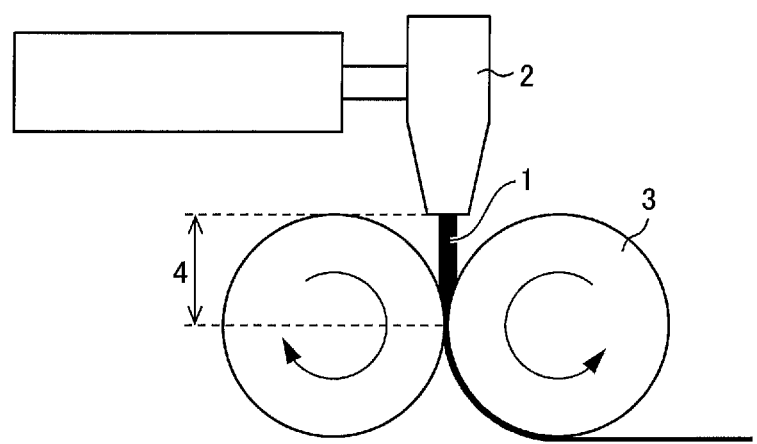

METHOD FOR PRODUCING NONAQUEOUS ELECTROLYTE SECONDARY BATTERY SEPARATOR

CROSS-REFERENCE TO RELATED APPLICATIONS

This application is a divisional of co-pending U.S. patent application Ser. No. 15/360,396, filed Nov. 23, 2016, which claims priority under 35 U.S.C. § 119(b) to Japanese Application No. 2015-233930, filed Nov. 30, 2015, the disclosures of which are incorporated herein by reference in their entirety.

TECHNICAL FIELD

The present invention relates to a separator for a nonaqueous electrolyte secondary battery (hereinafter referred to as a "nonaqueous electrolyte secondary battery separator") and use of the nonaqueous electrolyte secondary battery separator. More specifically, the present invention relates to a nonaqueous electrolyte secondary battery separator, a laminated separator for a nonaqueous electrolyte secondary battery (hereinafter referred to as a "nonaqueous electrolyte secondary battery laminated separator") including the nonaqueous electrolyte secondary battery separator, and a nonaqueous electrolyte secondary battery.

BACKGROUND ART

Nonaqueous electrolyte secondary batteries, especially lithium-ion secondary batteries, each have a high energy density. Thus, such nonaqueous electrolyte secondary batteries have been widely used as batteries for use in, for example, a personal computer, a mobile phone, and a portable information terminal, and also have recently been developed as on-vehicle batteries.

Conventionally, a microporous film that contains polyolefin as a main component has been used as a nonaqueous electrolyte secondary battery separator (hereinafter may also be referred to as merely a "separator") included in a nonaqueous electrolyte secondary battery such as a lithium-ion secondary battery (Patent Literature 1).

The microporous film has therein pores connected to one another, and allows a liquid containing ions to pass therethrough from one surface to the other. This microporous film is thus suitable as a battery separator member that exchanges ions between a cathode and an anode.

Meanwhile, recent widespread use of nonaqueous electrolyte secondary batteries has created a demand for longer-life nonaqueous electrolyte secondary batteries.

CITATION LIST

Patent Literature

[Patent Literature 1]
Japanese Patent Application Publication Tokukai No. 2003-105120 (Publication Date: Apr. 9, 2003)

SUMMARY OF INVENTION

Technical Problem

From the viewpoint of meeting such a demand for battery life extension, conventional nonaqueous electrolyte secondary batteries including a nonaqueous electrolyte secondary battery that includes the separator disclosed in Patent Literature 1 unfortunately cannot be said to have a sufficient long-term property (cycle characteristic). This creates a demand for a nonaqueous electrolyte secondary battery that continues to show a high discharge capacity maintaining ratio even after charge and discharge is repeated many times.

The present invention has been made in view of the problem, and an object of the present invention is to provide a nonaqueous electrolyte secondary battery that is so excellent in cycle characteristic as to sufficiently meet a demand for battery life extension.

Solution to Problem

In order to attain the object, the inventor of the present invention made a diligent study and finally accomplished the present invention by finding (i) that an amount by which a white index (hereinafter may also be referred to as "WI") of a separator changes before and after the separator is irradiated with ultraviolet light under a given condition is correlated with a cycle characteristic of a nonaqueous electrolyte secondary battery and (ii) that the amount which has a value that is not more than a given value makes it possible to provide a nonaqueous electrolyte secondary battery that can attain the object.

In order to attain the object, a nonaqueous electrolyte secondary battery separator in accordance with an aspect of the present invention includes a porous film containing a polyolefin-based resin as a main component, the nonaqueous electrolyte secondary battery separator having $\Delta WI$ of not more than 2.5, $\Delta WI$ being defined by the following Equation (1):

$$\Delta WI = WI_1 - WI_0 \qquad \text{Equation (1)}$$

where WI is a white index defined by American Standard Test Method (ASTM) E313, $WI_0$ is WI that is measured, by use of a spectrocolorimeter, on a surface of the porous film which has not been irradiated with ultraviolet light having 255 W/m², and $WI_1$ is WI that is measured, by use of the spectrocolorimeter, on the surface of the porous film which has been irradiated, for 75 hours, with the ultraviolet light having 255 W/m².

A nonaqueous electrolyte secondary battery laminated separator in accordance with an aspect of the present invention preferably includes a nonaqueous electrolyte secondary battery separator mentioned above and a porous layer.

A nonaqueous electrolyte secondary battery member in accordance with an aspect of the present invention includes: a cathode; a nonaqueous electrolyte secondary battery separator mentioned above; and an anode, the cathode, the nonaqueous electrolyte secondary battery separator, and the anode being provided in this order.

A nonaqueous electrolyte secondary battery in accordance with an aspect of the present invention includes a nonaqueous electrolyte secondary battery separator mentioned above or a nonaqueous electrolyte secondary battery laminated separator mentioned above.

Advantageous Effects of Invention

A nonaqueous electrolyte secondary battery separator in accordance with an aspect of the present invention has $\Delta WI$ of not more than 2.5, $\Delta WI$ being defined by Equation (1). Thus, the nonaqueous electrolyte secondary battery separator contains, in a smaller amount, an oxide that is, generated during production of a porous film and causes a battery to have a shorter life. This allows an aspect of the present invention to yield an effect of providing a nonaqueous electrolyte secondary battery that has an excellent cycle characteristic.

BRIEF DESCRIPTION OF DRAWINGS

FIG. 1 schematically illustrates how a sheet made of a resin is formed by extruding and rolling the resin.

DESCRIPTION OF EMBODIMENTS

The following description will specifically discuss an embodiment of the present invention. Note that "A to B" herein means "not less/lower than A and not more/higher than B".

Nonaqueous Electrolyte Secondary Battery Separator

A nonaqueous electrolyte secondary battery separator in accordance with an embodiment of the present invention includes a porous film containing a polyolefin-based resin as a main component, the nonaqueous electrolyte secondary battery separator having ΔWI of not more than 2.5, ΔWI being defined by the following Equation (1):

$$\Delta WI = WI_1 - WI_0 \quad \text{Equation (1)}$$

where WI is a white index defined by American Standard Test Method (ASTM) E313, $WI_0$ is WI that is measured, by use of a spectrocolorimeter, on a surface of the porous film which has not been irradiated with ultraviolet light having 255 W/m$^2$, and $WI_1$ is WI that is measured, by use of the spectrocolorimeter, on the surface of the porous film which has been irradiated, for 75 hours, with the ultraviolet light having 255 W/m$^2$.

(1) Porous Film

A porous film of an embodiment of the present invention contains a polyolefin-based resin as a main component, and is preferably a microporous film. That is, the porous film preferably (i) has therein pores connected to one another and (ii) contains, as a main component, a polyolefin-based resin that can pass therethrough a gas and/or a liquid from one surface to the other surface. The porous film can include a single layer or a plurality of layers.

The porous film that contains a polyolefin-based resin as a main component refers to a porous film that contains a polyolefin-based resin component in an amount typically of not lower than 50% by volume, preferably of not lower than 90% by volume, and more preferably of not lower than 95% by volume, relative to the entire porous film. The polyolefin-based resin contained in the porous film preferably contains a high molecular weight component having a weight-average molecular weight of 5×10$^5$ to 15×10$^6$. The porous film which contains, as the polyolefin-based resin, especially a polyolefin-based resin having a weight-average molecular weight of 1,000,000 is more preferable. This is because such a porous film allows an increase in strength of (i) the entire porous film, i.e., the entire nonaqueous electrolyte secondary battery separator and (ii) a nonaqueous electrolyte secondary battery laminated separator that includes the porous film and a porous layer (described later).

Examples of the polyolefin-based resin include high molecular weight homopolymers (such as polyethylene, polypropylene, and polybutene) and copolymers (such as an ethylene-propylene copolymer) produced by (co)polymerizing a monomer such as ethylene, propylene, 1-butene, 4-methyl-1-pentene, or 1-hexene. The porous film is a layer containing one kind of the polyolefin-based resins and/or a layer containing two or more kinds of the polyolefin-based resins. Among the above examples, a high molecular weight polyethylene-based resin containing ethylene as a main component is particularly preferable in terms of its capability to prevent (shut down) a flow of excessively large current at a lower temperature. Note that the porous film can contain other component different from a polyolefin-based resin, provided that the other component does not impair a function of the layer.

Examples of the polyethylene-based resin include low-density polyethylene, high-density polyethylene, linear polyethylene (an ethylene-α-olefin copolymer), and ultra-high molecular weight polyethylene having a weight-average molecular weight of not less than 1,000,000. Among these polyethylenes, ultra-high molecular weight polyethylene having a weight-average molecular weight of not less than 1,000,000 is still more preferable.

(2) Nonaqueous Electrolyte Secondary Battery Separator

The separator has a film thickness preferably of 4 μm to 40 μm, more preferably of 5 μm to 30 μm, and still more preferably of 6 μm to 15 μm.

The separator only needs to have a mass per unit area which mass is determined as appropriate in view of a strength, a film thickness, a weight, and handleability of the separator. Note, however, that the separator has a mass per unit area preferably of 4 g/m$^2$ to 20 g/m$^2$, more preferably of 4 g/m$^2$ to 12 g/m$^2$, and still more preferably of 5 g/m$^2$ to 10 g/m$^2$ so as to allow a nonaqueous electrolyte secondary battery including the separator to have a higher weight energy density and a higher volume energy density.

The separator has a Gurley air permeability preferably of 30 sec/100 mL to 500 sec/100 mL and more preferably of 50 sec/100 mL to 300 sec/100 mL. The separator which has a Gurley air permeability falling within the above range makes it possible to obtain sufficient ion permeability.

The separator has a porosity preferably of 20% by volume to 80% by volume and more preferably of 30% by volume to 75% by volume so as to (i) retain a larger amount of an electrolyte and (ii) obtain a function of preventing (shutting down) a flow of an excessively large electric current at a lower temperature without fail. Further, in order to obtain sufficient ion permeability and prevent particles from entering a cathode and/or an anode, the separator has pores having a pore size preferably of not larger than 0.3 μm and more preferably of not larger than 0.14 μm.

The nonaqueous electrolyte secondary battery separator in accordance with an embodiment of the present invention has ΔWI of not more than 2.5, ΔWI being defined by Equation (1). WI is an indicator of a color tone (whiteness) of a sample, and is used to indicate a fading characteristic of a dye or a degree of oxidation degradation in transparent or white resin that is being processed. Higher WI means a higher degree of whiteness.

A separator can be produced by, for example, (i) a method in which a porous film is obtained by adding a pore forming agent such as a filler or a plasticizer to a resin such as polyolefin so as to form a sheet, thereafter removing the pore forming agent by use of an appropriate solvent, and stretching the sheet from which the pore forming agent has been removed, or (ii) a method in which a porous film is obtained by adding a pore forming agent to a resin such as polyolefin so as to form a sheet, thereafter stretching the sheet, and removing the pore forming agent from the stretched sheet.

The sheet is formed by, for example, extruding, from a T-die or the like, the resin containing the pore forming agent, and then causing a pair of rollers to roll the resin so as to form the resin into a thin film. FIG. 1 schematically illustrates how a sheet made of a resin is formed by extruding and rolling the resin. In FIG. 1, a reference numeral 1 indicates a resin of which the separator is made, a reference numeral 2 indicates a T-die, a reference numeral 3 indicates a roller, and a reference numeral 4 indicates a distance between the T-die 2 and the roller 3.

For example, in Comparative Production. Examples 1 and 2 (described later), the sheet was formed under a condition where (i) the resin 1 had respective temperatures of 253° C. and 252° C. immediately before being extruded from the T-die 2, and (ii) the roller 3 had a surface temperature of 150° C. Note that this condition is a well-known condition that can be typically employed to produce a separator. During formation of the sheet, the resin 1 which has a high temperature is exposed to air during a period in which the resin 1 is extruded from the T-die 2 and then brought into contact with the roller 3. This brings the resin 1 into contact with oxygen, so that an oxide of the resin 1 is generated. The oxide may cause a side reaction during charge and discharge of a battery and consequently shortens a life of the battery. Thus, the porous film preferably contains the oxide in an amount as small as possible.

Meanwhile, the oxide loses color in response to ultraviolet light irradiation. In view of this, the porous film which more greatly changes in WI in a case where (i) WI measured on a surface of the porous film which has not been irradiated with ultraviolet light and (ii) WI measured on the surface of the porous film which has been irradiated with ultraviolet light are compared can be said to contain the oxide in a greater amount.

The inventor of the present invention carried out a study while considering that production of a separator that less changes in WI, i.e., a separator that contains the oxide in a smaller amount, makes it possible to achieve battery life extension while preventing the oxide from influencing a cycle characteristic of a battery. The study made it clear that the porous film which has ΔWI of not more than 2.5, ΔWI being defined by Equation (1), allows a nonaqueous electrolyte secondary battery including a separator, which is the porous film, to have an excellent cycle characteristic.

There had conventionally not existed knowledge (i) that an amount of change in WI and a cycle characteristic of a nonaqueous electrolyte secondary battery are correlated with each other and (ii) that a nonaqueous electrolyte secondary battery having an excellent cycle characteristic can be provided by adjusting ΔWI to not more than 2.5. This knowledge was found out by the present invention for the first time.

As defined by Equation (1), ΔWI is a difference between (a) WI ($WI_0$) measured, by use of a spectrocolorimeter, on the surface of the porous film which has not been irradiated with ultraviolet light having an intensity of 255 W/m² and (b) WI ($WI_1$) measured, by use of the spectrocolorimeter, on the surface of the porous film which has been irradiated, for 75 hours, with the ultraviolet light having an intensity of 255 W/m². $WI_0$ is WI measured on the surface of the porous film which has not been irradiated with the ultraviolet light of 255 W/m² (i.e., WI measured on the surface of the porous film before 255 W/m² ultraviolet light irradiation starts to be carried out with respect to the porous film).

The spectrocolorimeter is, for example, preferably an integrating-sphere spectrocolorimeter, which can easily and accurately measure WI. The integrating-sphere spectrocolorimeter is a device for carrying out optical spectrometric measurement by (i) irradiating a sample with light of a xenon lamp and (ii) causing an integrating sphere that covers the vicinity of an irradiated portion to collect, in a light receiving section, light reflected from the sample. The integrating-sphere spectrocolorimeter allows measurement of various optical parameters. Note, however, that the spectrocolorimeter is not particularly limited to the integrating-sphere spectrocolorimeter, and can be any spectrocolorimeter that can measure WI.

The "surface of the porous film" refers to a part of the porous film which part receives light emitted from the spectrocolorimeter. The measurement of WI on the surface of the porous film by use of the spectrocolorimeter only needs to be carried out in accordance with an instruction manual of a spectrocolorimeter to be used, and does not need to be carried out by any particular method. Note, however, that in order that light reflected by the porous film can be easily collected in a light receiving section of the spectrocolorimeter, it is preferable to, for example, irradiate the porous film which is placed on black paper.

The 255 W/m² ultraviolet light irradiation is preferably carried out by use of a device that can continuously carry out ultraviolet light irradiation. For example, it is possible to use a fade meter or a weatherometer (e.g., sunshine weather meter S80 manufactured by Suga Test Instruments Co., Ltd.) defined by JIS B 7753. In a case where the sunshine weather meter S80 is used, the ultraviolet light irradiation is carried out with respect to a test piece for 75 hours by use of a sunshine carbon arc light lamp (four pairs of ultra long life carbon), which, is set to have a discharge voltage of 50 V and a discharge current of 60 A, and under conditions of a black panel temperature of 60° C. and a relative humidity of 50%.

The test machine mentioned above can continuously expose a sample to ultraviolet light by rotation on an ultraviolet light lamp of a metal plate to which the sample has been attached. A weatherometer can (i) intermittently spray a test piece with water while irradiating the test piece with light that is emitted from an artificial light source and resembles natural sunlight, or (ii) repeat (a) a state of irradiation of a test piece with light that is emitted from an artificial light source and resembles natural sunlight and (b) a state of darkness caused by turning off the artificial light source, and spray a back surface of the test piece with cold water in the state of darkness. As such, the weatherometer can simulate a rainy weather (high humidity) condition. Note, however, that according to the present invention, it is only necessary to cause the porous film to lose color to an extent that a difference between $WI_0$ and $WI_1$ can be calculated, and thus it is not particularly necessary to simulate a rainy weather (high humidity) condition.

As shown in Examples (described later), in a case where the porous film has ΔWI of not more than 2.5, ΔWI being defined by Equation (1), a nonaqueous electrolyte secondary battery produced by use of the porous film has a high discharge capacity maintaining ratio of more than 70.0% even after being subjected to 180 cycles of charge and discharge. As described earlier, ΔWI is correlated with an amount of an oxide contained in the porous film, and higher ΔWI indicates that the oxide is contained in a greater amount. Thus, smaller ΔWI is more preferable. This makes it essential that ΔWI be not more than 2.5, more preferably not more than 2.3, and still more preferably not more than 2.2. Note that ΔWI has a lower limit preferably of not less than −10, more preferably of not less than −5, and most preferably of 0.

The porous film which has ΔWI of not more than 2.5 can be produced by causing a resin which has a high temperature to be exposed to air for a shorter time during formation of a sheet. In a case where FIG. 1 is taken as an example, the porous film which has ΔWI of not more than 2.5 can be produced by, for example, a method (1) in which the resin 1 is extruded from the T-die 2 at a lower temperature (extrusion temperature), a method (2) in which the resin 1 is extruded at a higher speed so that the resin 1 is in contact with oxygen for a shorter time, a method (3) in which the distance 4 between the T-die 2 and the roller 3 is made shorter, and/or (4) the like.

In a case where (a) the fact that the resin 1 needs to be extruded at a temperature that is raised to a relatively high temperature and (b) the fact that the resin 1 which has a high temperature needs to be exposed to air for a shorter time are considered by comparison, the extrusion temperature is preferably 200° C. to 250° C., more preferably 220° C. to 249° C., and still more preferably 240° C. to 248° C. in the method (1) (described earlier). Note that the extrusion temperature refers to a temperature measured immediately before the resin is extruded from an outlet (e.g., a T-die) of an extrusion machine, and is equal to a preset temperature of the outlet.

The extrusion speed, which also depends on a throughput capacity of the extrusion machine and thus cannot be generalized, is preferably 1 m/min to 10 m/min, more preferably 2 m/min to 8 m/min, and still more preferably 2.5 m/min to 5 m/min in the method (2) (described earlier).

As shown in Comparative Example 1 (described later), in a case where the extrusion temperature exceeds 250° C., there was a tendency for an oxide to be contained in the resin in a greater amount even if the extrusion speed was increased. Thus, it is considered that the oxide can be contained in the porous film in a smaller amount by increasing the extrusion speed after setting the extrusion temperature to such a preferable temperature as described earlier.

The distance 4 is preferably as short as possible in the method (3) (described earlier), provided that the distance does not prevent movement of the roller 3. Note that the roller 3 has a surface temperature preferably of 120° C. to 160° C., more preferably of 130° C. to 155° C., and still more preferably of 140° C. to 150° C.

The above description has discussed conditions under which to extrude the resin. Note, however, that the porous film which has ΔWI of not more than 2.5 can be effectively produced also by a method (4) in which in order that a pore forming agent is removed from a sheet that has been formed by being rolled by the roller 3, a surfactant is added to a solvent through which the sheet is allowed to pass. Assume, for example, that an aqueous hydrochloric acid solution is used as the solvent and the pore forming agent (e.g., calcium carbonate) that has been dispersed in the sheet is removed by dissolving the pore forming agent in the aqueous hydrochloric acid solution. In this case, the aqueous hydrochloric acid solution to which the surfactant is added can permeate, with a higher degree, through a polyolefin-based resin of which the sheet is made. As a result, the oxide which is contained in the resin and which is an organic matter and thus is normally insoluble in an aqueous hydrochloric acid solution is more easily dissolved in the aqueous hydrochloric acid solution. This makes it possible to promote extraction of the oxide into the aqueous hydrochloric acid solution.

As the surfactant, any of an anionic surfactant, a cationic surfactant, a non-ionic surfactant, and an amphoteric surfactant can be used. Note, however, that a non-ionic surfactant, which is less susceptible to acid and alkali, is preferably used. A cleaning liquid to which the surfactant is added in a larger amount allows (i) the cleaning (removal) of the pore forming agent and (ii) removal of the oxide to be carried out with higher efficiency. Note, however, that the cleaning liquid to which the surfactant is added in a too large amount may cause the surfactant to remain in the separator. The surfactant is added in an amount preferably of not less than 0.1% by weight and not more than 15% by weight, and more preferably of 0.1% by weight to 10% by weight, relative to 100% by weight of the cleaning liquid.

The pore forming agent is removed with higher efficiency in accordance with an increase in temperature (cleaning temperature) of the solvent. Note, however, that an excessive increase in temperature of the solvent causes evaporation of the cleaning liquid. Thus, the solvent which is, for example, water has a temperature preferably of not lower than 25° C. and not higher than 60° C., more preferably of not lower than 30° C. and not higher than 55° C., and particularly preferably of not lower than 35° C. and not higher than 50° C. Note that the "cleaning temperature" refers to a temperature of the cleaning liquid in which the sheet has been immersed.

The sheet which has been cleaned with the solvent can further be cleaned with water. The cleaning with water is carried out at a water-cleaning temperature preferably of not lower than 25° C. and not higher than 60° C., more preferably of not lower than 30° C. and not higher than 55° C., and particularly preferably of not lower than 35° C. and not higher than 50° C. This is because though a higher water-cleaning temperature allows the cleaning with water with higher efficiency, a too high water-cleaning temperature causes a cleaning liquid (water) to evaporate. Note that the "water-cleaning temperature" refers to a temperature of the water in which the sheet has been immersed.

The porous film which is formed by one or more methods selected from the methods (1) through (4) (described earlier) can contain the oxide in a smaller amount. This makes it possible to produce the porous film which has ΔWI of not more than 2.5. Of the methods (1) through (4), adjustment of the extrusion temperature of the resin (the method (1)) and addition of the surfactant to the solvent (the method (4)) are more preferably used in combination to form the porous film. This is because the method (1) and the method (4) each (i) allow the conditions, under which to extrude the resin, to be easily adjusted and (ii) allow the oxide to be effectively removed.

The filler (pore forming agent) is exemplified by but not particularly limited to an inorganic filler that is soluble in an acid-containing aqueous solvent, an inorganic filler that is soluble in an alkali-containing aqueous solvent, or an inorganic filler that is soluble in an aqueous solvent mainly composed of water.

Examples of the inorganic filler that is soluble in an aqueous acidic solvent include calcium carbonate, magnesium carbonate, barium carbonate, zinc oxide, calcium oxide, aluminum hydroxide, magnesium hydroxide, calcium hydroxide, calcium sulfate, and the like. Of these inorganic fillers, calcium carbonate is preferable in terms of easiness to obtain a fine powder thereof at low cost.

Examples of the inorganic filler that is soluble in an aqueous alkaline solvent include silicic acid and zinc oxide, and the like. Of these inorganic fillers, silicic acid is preferable in terms of easiness to obtain a fine powder thereof at low cost.

Examples of the inorganic filler that is soluble in an aqueous solvent mainly composed of water include calcium chloride, sodium chloride, magnesium sulfate, and the like.

The plasticizer (pore forming agent) is exemplified by but not particularly limited to low-molecular-weight hydrocarbon such as liquid paraffin.

The nonaqueous electrolyte secondary battery separator in accordance with an embodiment of the present invention has ΔWI of not more than 2.5, and thus contains the oxide in a smaller amount than a conventionally known separator. Thus, the nonaqueous electrolyte secondary battery separator allows a side reaction to be less likely to occur during charge and discharge of a nonaqueous electrolyte secondary battery, and consequently makes it possible to provide a nonaqueous electrolyte secondary battery that has an excellent cycle characteristic.

Nonaqueous Electrolyte Secondary Battery Laminated Separator

The nonaqueous electrolyte secondary battery separator in accordance with an embodiment of the present invention can also include publicly known porous layer(s) such as an adhesive layer, a heat-resistant layer, and/or a protective layer. A separator including the nonaqueous electrolyte secondary battery separator and a porous layer is herein referred to as a nonaqueous electrolyte secondary battery laminated separator (hereinafter may be referred to as a "laminated separator").

The separator is more preferably subjected to a hydrophilization treatment before the porous layer is formed, i.e., before the separator is coated with a coating solution. The separator which is subjected to the hydrophilization treatment is more easily coated with the coating solution. This makes it possible to form the porous layer which is more uniform. The hydrophilization treatment is effective in a case where water accounts for a high percentage of a solvent (dispersion medium) contained in the coating solution.

Specific examples of the hydrophilization treatment include publicly known treatments such as a chemical treatment with an acid, an alkali, or the like, a corona treatment, and a plasma treatment. Among these hydrophilization treatments, the corona treatment is more preferable. This is because the corona treatment not only allows the separator to be hydrophilized in a relatively short time but also causes only a surface and its vicinity of the separator to be hydrophilized and consequently prevents an inside of the separator from changing in quality.

Porous Layer

The porous layer is preferably a resin layer containing a resin. A resin of which the porous layer is made is preferably (i) insoluble in an electrolyte of the nonaqueous electrolyte secondary battery and (ii) electrochemically stable in a range of use of the nonaqueous electrolyte secondary battery. In a case where the porous layer is laminated to one surface of the separator which is used as a member of the nonaqueous electrolyte secondary battery, the porous layer is preferably laminated to a surface of the separator which surface faces a cathode of the nonaqueous electrolyte secondary battery, and is more preferably laminated to a surface of the separator which surface is in contact with the cathode.

Examples of the resin of which the porous layer is made include: polyolefins such as polyethylene, polypropylene, polybutene, and an ethylene-propylene copolymer; fluorine-containing resins such as polyvinylidene fluoride (PVDF) and polytetrafluoroethylene; fluorine-containing rubbers such as: a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; aromatic polyamide; wholly aromatic polyamide (aramid resin); rubbers such as a styrene-butadiene copolymer and hydride thereof, a methacrylate ester copolymer, an acrylonitrile-acrylic ester copolymer, a styrene-acrylic ester copolymer, ethylene propylene rubber, and polyvinyl acetate; resins having a melting point or a glass transition temperature of not less than 180° C., such as polyphenylene ether, polysulfone, polyether sulfone, polyphenylene sulfide, polyetherimide, polyamide-imide, polyether amide, and polyester; water-soluble polymers such as polyvinyl alcohol, polyethylene glycol, cellulose ether, sodium alginate, polyacrylic acid, polyacrylamide, and polymethacrylic acid; and the like.

Specific examples of the aromatic polyamide include poly(paraphenylene terephthalamide), poly(methaphenylene isophthalamide), poly(parabenzamide), poly(methabenzamide), poly(4,4'-benzanilide terephthalamide), poly(paraphenylene-4,4'-biphenylene dicarboxylic acid amide), poly(methaphenylene-4,4'-biphenylene dicarboxylic acid amide), poly(paraphenylene-2,6-naphthalene dicarboxylic acid amide), poly(methaphenylene-2,6-naphthalene dicarboxylic acid amide), poly(2-chloroparaphenylene terephthalamide), paraphenylene terephthalamide/2,6-dichloroparaphenylene terephthalamide copolymer, and methaphenylene terephthalamide/2,6-dichloroparaphenylene terephthalamide copolymer. Among these aromatic polyamides, poly(paraphenylene terephthalamide) is more preferable.

Among the above resins, polyolefin, a fluorine-containing resin, aromatic polyamide, and a hydrosoluble polymer are more preferable. Above all, a fluorine-containing resin is particularly preferable in a case where the porous layer is provided so as to face the cathode of the nonaqueous electrolyte secondary battery. Even in a case where a deterioration in acidity occurs while the nonaqueous electrolyte secondary battery is being operated, using a fluorine-containing resin makes it easier to maintain various performance capabilities such as a rate characteristic and a resistance characteristic (solution resistance) of the nonaqueous electrolyte secondary battery. From the viewpoint of a process and an environmental load, a hydrosoluble polymer, which allows water to be used as a solvent for forming the porous layer, is more preferable, cellulose ether and sodium alginate are still more preferable, and cellulose ether is particularly preferable.

Specific examples of the cellulose ether include carboxymethyl cellulose (CMC), hydroxyethyl cellulose (HEC), carboxy ethyl cellulose, methyl cellulose, ethyl cellulose, cyan ethyl cellulose, oxyethyl cellulose, and the like. Among these cellulose ethers, CMC and HEC, each of which less deteriorates while being used for a long time and is excellent in chemical stability, are more preferable, and CMC is particularly preferable.

The porous layer more preferably contains a filler. Thus, in a case where the porous layer contains a filler, the resin functions also as a binder resin. The filler, which is not particularly limited to any specific filler, can be a filler made of an organic matter or a filler made of an inorganic matter.

Specific examples of the filler made of an organic matter include fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, an ethylene tetrafluoride-propylene hexafluoride copolymer, a tetrafluoroethylene-ethylene copolymer, and polyvinylidene fluoride; melamine resin; urea resin; polyethylene; polypropylene; polyacrylic acid and polymethacrylic acid; and the like.

Specific examples of the filler made of an inorganic matter include fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. The porous layer can contain (i) only one kind of filler or (ii) two or more kinds of fillers in combination.

Among the above fillers, a filler made of an inorganic matter is suitable. A filler made of an inorganic oxide such as silica, calcium oxide, magnesium oxide, titanium oxide, alumina, mica, zeolite, aluminum hydroxide, or boehmite is preferable. A filler made of at least one kind selected from the group consisting of silica, magnesium oxide, titanium oxide, aluminum hydroxide, boehmite, and alumina is more preferable. A filler made of alumina is particularly preferable. Alumina has many crystal forms such as α-alumina, β-alumina, γ-alumina, and θ-alumina, and any of the crystal forms can be suitably used. Among the above crystal forms, α-alumina, which is particularly high in thermal stability and chemical stability, is the most preferable.

The filler has a shape that varies depending on, for example, (i) a method for producing the organic matter or inorganic matter as a raw material and (ii) a condition under which the filler is dispersed during preparation of a coating solution for forming the porous layer. The filler can have any of various shapes such as a spherical shape, an oblong shape, a rectangular shape, a gourd shape, and an indefinite irregular shape.

In a case where the porous layer contains a filler, the filler is contained in an amount preferably of 1% by volume to 99% by volume and more preferably of 5% by volume to 95% by volume of the porous layer. The filler which is contained in the filler in an amount falling within the above range make it less likely for a void formed by a contact among fillers to be blocked by, for example, a resin. This makes it possible to obtain sufficient ion permeability and to set a mass per unit area of the porous layer at an appropriate value.

According to an embodiment of the present invention, a coating solution for forming the porous layer is normally prepared by dissolving the resin in a solvent and dispersing the filler in a resultant solution.

The solvent (dispersion medium), which is not particularly limited to any specific solvent, only needs to (i) have no harmful influence on, the porous film, (ii) uniformly and stably dissolve the resin, and (iii) uniformly and stably disperse the filler. Specific examples of the solvent (dispersion medium) include: water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, and N,N-dimethylformamide; and the like. The above solvents (dispersion media) can be used in only one kind or in combination of two or more kinds.

The coating solution can be formed by any method provided that the coating solution can meet conditions such as a resin solid content (resin concentration) and a filler amount each necessary for obtainment of a desired porous layer. Specific examples of a method for forming the coating solution include a mechanical stirring method, an ultrasonic dispersion method, a high-pressure dispersion method, a media dispersion method, and the like.

Further, the filler can be dispersed in the solvent (dispersion medium) by use of, for example, a conventionally publicly known disperser such as a three-one motor, a homogenizer, a media disperser, or a pressure disperser.

In addition, the coating solution can contain, as a component different from the resin and the filler, additive(s) such as a disperser, a plasticizer, a surfactant, and/or a pH adjustor, provided that the additive(s) does/do not impair the object of the present invention. Note that the additive(s) can be contained in an amount that does not impair the object of the present invention.

A method for applying the coating solution to the separator, i.e., a method for forming the porous layer on a surface of the separator which has been appropriately subjected to a hydrophilization treatment is not particularly restricted. In a case where the porous layer is laminated to both sides of the separator, (i) a sequential lamination method in which the porous layer is formed on one side of the separator and then the porous layer is formed on the other side of the separator, or (ii) a simultaneous lamination method in which the porous layer is formed simultaneously on both sides of the separator is applicable to the case.

Examples of a method for forming the porous layer include: a method in which the coating solution is directly applied to the surface of the separator and then the solvent (dispersion medium) is removed; a method in which the coating solution is applied to an appropriate support, the porous layer is formed by removing the solvent (dispersion medium), and thereafter the porous layer thus formed and the separator are pressure-bonded and subsequently the support is peeled off; a method in which the coating solution is applied to the appropriate support and then the separator is pressure-bonded to an application surface, and subsequently the support is peeled off and then the solvent (dispersion medium) is removed; a method in which the separator is immersed in the coating solution so as to be subjected to dip coating, and thereafter the solvent (dispersion medium) is removed; and the like.

The porous layer can have a thickness that is controlled by adjusting, for example, a thickness of a coated film that is moist (wet) after being coated, a weight ratio between the resin and the filler, and/or a solid content concentration (a sum of a resin concentration and a filler concentration) of the coating solution. Note that it is possible to use, as the support, a film made of resin, a belt made of metal, or a drum, for example.

A method for applying the coating solution to the separator or the support is not particularly limited to any specific method provided that the method achieves a necessary mass per unit area and a necessary coating area. It is possible to employ a conventionally publicly known method as a coating solution application method. Specific examples of such a conventionally publicly known coating solution application method include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, a spray application method, and the like.

Generally, the solvent (dispersion medium) is removed by drying. Examples of a drying method include natural drying, air-blowing drying, heat drying, vacuum drying, and the like. Note, however, that any drying method is usable provided that the drying method allows the solvent (dispersion medium) to be sufficiently removed. For the drying, it is possible to use an ordinary drying device.

Further, it is possible to carry out the drying after replacing the solvent (dispersion medium) contained in the coating solution with another solvent. Examples of a method for removing the solvent (dispersion medium) after replacing the solvent (dispersion medium) with another solvent include a method in which a resin is dissolved in the solvent (dispersion medium) contained in the coating solution, another solvent (hereinafter referred to as a solvent X) that does not dissolve the resin contained in coating solution is used, the separator or the support on which a coated film has been formed by application of the coating solution is immersed in the solvent X, the solvent (dispersion medium) contained in the coated film formed on the separator or the support is replaced with the solvent X, and thereafter the solvent X is evaporated. This method makes it possible to efficiently remove the solvent (dispersion medium) from the coating solution.

Assume that heating is carried out so as to remove the solvent (dispersion medium) or the solvent X from the coated film of the coating solution which coated film has been formed on the separator or the support. In this case, in order to prevent the separator from having a lower air permeability due to contraction of pores of the separator, it is desirable to carry out heating at a temperature at which the separator does not have a lower air permeability, specifically, 10° C. to 120° C., more preferably 20° C. to 80° C.

In a case where the separator is used as the base material to form the laminated separator by laminating the porous layer to one side or both sides of the separator, the porous layer formed by the method described earlier has, per one side thereof, a film thickness preferably of 0.5 µm to 15 µm and more preferably of 2 µm to 10 µm.

The porous layer whose both sides have a film thickness of less than 1 µm in total cannot sufficiently prevent an internal short circuit caused by, for example, breakage in a nonaqueous electrolyte secondary battery which includes the laminated separator. Furthermore, such a porous layer retains a smaller amount of electrolyte.

Meanwhile, the porous layer whose both sides have a film thickness of more than 30 µm in total causes an increase in permeation resistance of lithium ions in the entire laminated separator which is included in a nonaqueous electrolyte secondary battery. Thus, in a case where charge and discharge cycles are repeated, a cathode of the nonaqueous electrolyte secondary battery deteriorates and consequently decreases in rate characteristic and/or cycle characteristic. Furthermore, such a porous layer increases a distance between the cathode and an anode of the nonaqueous electrolyte secondary battery. This makes the nonaqueous electrolyte secondary battery larger in size.

In a case where the porous layer is laminated to both sides of the separator, physical properties of the porous layer which are described below at least refer to physical properties of the porous layer which is laminated to a surface of the laminated separator which surface faces the cathode of the nonaqueous electrolyte secondary battery which includes the laminated separator.

The porous layer only needs to have, per one side thereof, a mass per unit area which mass is appropriately determined in view of a strength, a film thickness, a weight, and handleability of the laminated separator. In a case where the nonaqueous electrolyte secondary battery includes the laminated separator, the porous layer normally has a mass per unit area preferably of 1 g/m$^2$ to 20 g/m$^2$ and more preferably of 2 g/m$^2$ to 10 g/m$^2$.

The porous layer which has a mass per unit area which mass falls within the above range allows the nonaqueous electrolyte secondary battery including the porous layer to have a higher weight energy density and a higher volume energy density. Meanwhile, the porous layer which has a mass per unit area which mass is beyond the above range causes the nonaqueous electrolyte secondary battery including the laminated separator to have a greater weight.

The porous layer has a porosity preferably of 20% by volume to 90% by volume and more preferably of 30% by volume to 80% by volume so that sufficient ion permeability can be obtained. Further, the porous layer has pores having a pore size preferably of not more than 1.0 µm and more preferably of not more than 0.5 µm. The porous layer which has pores having a pore size falling within the above range allows the nonaqueous electrolyte secondary battery which includes the laminated separator including such a porous layer to obtain sufficient ion permeability.

The laminated separator has a Gurley air permeability preferably of 30 sec/100 mL to 1000 sec/100 mL and more preferably of 50 sec/100 mL to 800 sec/100 mL. The laminated separator which has a Gurley air permeability falling within the above range makes it possible to obtain sufficient ion permeability in a case where the laminated separator is used as a member for the nonaqueous electrolyte secondary battery.

Meanwhile, the laminated separator which has a Gurley air permeability beyond the above range means that the laminated separator has a coarse laminated structure due to a high porosity thereof. This causes the laminated separator to have a lower strength, so that the laminated separator may be insufficient in shape stability, particularly shape stability at a high temperature. In contrast, the laminated separator which has a Gurley air permeability falling below the above range makes it impossible to obtain sufficient ion permeability in a case where the separator is used as a member for the nonaqueous electrolyte secondary battery. This may cause the nonaqueous electrolyte secondary battery to have a lower battery characteristic.

As described earlier, the separator included in the laminated separator in accordance with an embodiment of the present invention has ΔWI of not more than 2.5 and thus contains the oxide in a smaller amount than a conventionally known separator. Thus, as in the case of the separator, the laminated separator allows a side reaction to be less likely to occur during charge and discharge of a nonaqueous electrolyte secondary battery, and consequently makes it possible to provide a nonaqueous electrolyte secondary battery that has an excellent cycle characteristic.

Nonaqueous Electrolyte Secondary Battery Member, Nonaqueous Electrolyte Secondary Battery The nonaqueous electrolyte secondary battery in accordance with an embodiment of the present invention includes the separator (described earlier) or the laminated separator (described earlier) (hereinafter each of the separator and the laminated separator may also be collectively referred to as a "separator or the like"). More specifically, the nonaqueous electrolyte secondary battery in accordance with an embodiment of the present invention includes a nonaqueous electrolyte secondary battery member including a cathode, a separator or the like, and an anode that are provided in this order. That is, the nonaqueous electrolyte secondary battery member is also encompassed in the scope of the present invention. The following description takes a lithium ion secondary battery member as an example of the nonaqueous electrolyte secondary battery. Note that components of the nonaqueous electrolyte secondary battery except the separator are not limited to those discussed in the following description.

In the nonaqueous electrolyte secondary battery in accordance with an embodiment of the present invention, it is possible to use, for example, a nonaqueous electrolyte obtained by dissolving lithium salt in an organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, $LiAlCl_4$, and the like. The above lithium salts can be used in only one kind or in combination of two or more kinds.

Of the above lithium salts, at least one kind of fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$ is more preferable.

Specific examples of the organic solvent of the nonaqueous electrolyte include: carbonates such as ethylene carbonate, propylene carbonate, dimethyl carbonate, diethyl carbonate, ethyl methyl carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethylsulfoxide, and 1,3-propanesultone; a fluorine-containing organic solvent obtained by introducing a fluorine group in the organic solvent; and the like. The above organic solvents can be used in only one kind or in combination of two or more kinds.

Of the above organic solvents, a carbonate is more preferable, and a mixed solvent of cyclic carbonate and acyclic carbonate or a mixed solvent of cyclic carbonate and an ether is more preferable.

The mixed solvent of cyclic carbonate and acyclic carbonate is more preferably exemplified by a mixed solvent containing ethylene carbonate, dimethyl carbonate, and ethyl methyl carbonate. This is because the mixed solvent containing ethylene carbonate, dimethyl carbonate, and ethyl methyl carbonate operates in a wide temperature range, and is refractory also in a case where a graphite material such as natural graphite or artificial graphite is used as an anode active material.

Normally, a sheet cathode in which a cathode current collector supports thereon a cathode mix containing a cathode active material, an electrically conductive material, and a binding agent is used as the cathode.

Examples of the cathode active material include a material that is capable of doping and dedoping lithium ions. Examples of such a material include lithium complex oxides each containing at least one kind of transition metal selected from the group consisting of V, Mn, Fe, Co, and Ni.

Of the above lithium complex oxides, a lithium complex oxide having an α-$NaFeO_2$ structure, such as lithium nickel oxide or lithium cobalt oxide, or a lithium complex oxide having a spinel structure, such as lithium manganate spinel is more preferable. This is because such a lithium complex oxide is high in average discharge potential. The lithium complex oxide can contain various metallic elements, and lithium nickel complex oxide is more preferable.

Further, it is particularly preferable to use lithium nickel complex oxide which contains at least one kind of metallic element so that the at least one kind of metallic element accounts for 0.1 mol % to 20 mol % of a sum of the number of moles of the at least one kind of metallic element and the number of moles of Ni in lithium nickel oxide, the at least one kind of metallic element being selected from the group consisting of Ti, Zr, Ce, Y, V, Cr, Mn, Fe, Co, Cu, Ag, Mg, Al, Ga, In, and Sn. This is because such lithium nickel complex oxide is excellent in cycle characteristic during use of the nonaqueous electrolyte secondary battery at a high capacity. Especially an active material which contains Al or Mn and has an Ni content of not less than 85 mol % and more preferably of not less than 90 mol % is particularly preferable. This is because such an active material is excellent in cycle characteristic during use of the nonaqueous electrolyte secondary battery at a high capacity, the nonaqueous electrolyte secondary battery including the cathode containing the active material. Note here that relative to a sum (100%) of the number of moles (mol %) of Al or Mn and the number of moles (mol %) of Ni in lithium nickel oxide, Al or Mn is contained in an amount of 0.1 mol % to 20 mol %, and Ni is contained in an amount of not less than 85 mol % and more preferably of not less than 90 mol %.

Examples of the electrically conductive material include carbonaceous materials such as natural graphite, artificial graphite, cokes, carbon black, pyrolytic carbons, carbon fiber, organic high molecular compound baked bodies, and the like. The above electrically conductive materials can be used in only one kind. Alternatively, the above electrically conductive materials can be used in combination of two or more kinds by, for example, mixed use of artificial graphite and carbon black.

Examples of the binding agent include polyvinylidene fluoride, a vinylidene fluoride copolymer, polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-tetrafluoroethylene copolymer, a vinylidene fluoride-trifluoroethylene copolymer, a vinylidene fluoride-trichloroethylene copolymer, and a vinylidene fluoride-vinyl fluoridecopolymer, a vinylidene fluoride-hexafluoropropylene-tetrafluoroethylene copolymer, thermoplastic resins such as thermoplastic polyimide, thermoplastic polyethylene, and thermoplastic polypropylene, acrylic resin, and styrene butadiene rubber. Note that the binding agent also functions as a thickener.

The cathode mix can be obtained by, for example, pressing the cathode active material, the electrically conductive material, and the binding agent on the cathode current collector, or causing the cathode active material, the electrically conductive material, and the binding agent to be in a form of paste by use of an appropriate organic solvent.

Examples of the cathode current collector include electrically conductive materials such as Al, Ni, and stainless steel, and Al, which is easy to process into a thin film and less expensive, is more preferable.

Examples of a method for producing the sheet cathode, i.e., a method for causing the cathode current collector to support the cathode mix include: a method in which the cathode active material, the electrically conductive material, and the binding agent which are to be formed into the cathode mix are pressure-molded on the cathode current collector; a method in which the cathode current collector is coated with the cathode mix which has been obtained by causing the cathode active material, the electrically conductive material, and the binding agent to be in a form of paste by use of an appropriate organic solvent, and a sheet cathode mix obtained by drying is pressed so as to be closely fixed to the cathode current collector; and the like.

Normally, a sheet anode in which an anode current collector supports thereon an anode mix containing an anode active material is used as the anode. The sheet anode preferably contains the electrically conductive material and the binding agent.

Examples of the anode active material include a material that is capable of doping and dedoping lithium ions, lithium metal or lithium alloy, and the like. Specific examples of such a material include: carbonaceous materials such as natural graphite, artificial graphite, cokes, carbon black, pyrolytic carbons, carbon fiber, and organic high molecular compound baked bodies; chalcogen compounds such as oxides and sulfides each doping and dedoping lithium ions at a lower potential than that of the cathode; metals such as aluminum (Al), lead (Pb), tin (Sn), bismuth (Bi), and silicon (Si) each alloyed with an alkali metal; cubic intermetallic compounds (AlSb, $Mg_2Si$, $NiSi_2$) having lattice spaces in which alkali metals can be provided; lithium nitrogen compounds ($Li_{3-x}M_xN$ (M: transition metal)); and the like.

Of the above anode active materials, a carbonaceous material which contains, as a main component, a graphite material such as natural graphite or artificial graphite is preferable. This is because such a carbonaceous material is high in potential evenness, and a great energy density can be obtained in a case where the carbonaceous material, which is low in average discharge potential, is combined with the cathode. An anode active material which is a mixture of a graphite material and silicon and has an Si to C ratio of not less than 5% is more preferable, and an anode active material which is a mixture of a graphite material and silicon and has an Si to C ratio of not less than 10% is still more preferable. That is, Si is preferably contained in an amount of not less than 5 mol % and more preferably of 10 mol % relative to a sum (100 mol %) of the number of moles of C, which is the graphite material, and the number of moles of Si.

The anode mix can be obtained by, for example, pressing the anode active material on the anode current collector, or causing the anode active material to be in a form of paste by use of an appropriate organic solvent.

Examples of the anode current collector include Cu, Ni, stainless steel, and the like, and Cu, which is difficult to alloy with lithium particularly in a lithium ion secondary battery and easy to process into a thin film, is more preferable.

Examples of a method for producing the sheet anode, i.e., a method for causing the anode current collector to support the anode mix include: a method in which the anode active material to be formed into the anode mix are pressure-molded on the anode current collector; a method in which the cathode current collector is coated with the anode mix which has been obtained by causing the anode active material to be in a form of paste by use of an appropriate organic solvent, and a sheet anode mix obtained by drying is pressed so as to be closely fixed to the anode current collector; and the like. The paste preferably contains the electrically conductive material and the binding agent.

The nonaqueous electrolyte secondary battery member in accordance with an embodiment of the present invention is formed by providing the cathode, the separator or the like, and the anode in this order. Thereafter, the nonaqueous electrolyte secondary battery member is placed in a container serving as a housing of the nonaqueous electrolyte secondary battery. Subsequently, the container is filled with a nonaqueous electrolyte, and then the container is sealed while being decompressed. The nonaqueous electrolyte secondary battery in accordance with an embodiment of the present invention can thus be produced. The nonaqueous electrolyte secondary battery, which is not particularly limited in shape, can have any shape such as a sheet (paper) shape, a disc shape, a cylindrical shape, or a prismatic shape such as a rectangular prismatic shape. Note that a method for producing the nonaqueous electrolyte secondary battery is not particularly limited to any specific method, and a conventionally publicly known production method can be employed as the method.

As described earlier, the nonaqueous electrolyte secondary battery in accordance with an embodiment of the present invention includes (i) a separator having ΔWI of not more than 2.5 or (ii) a laminated separator including the separator and a porous layer. Such a separator contains a smaller amount of an oxide of a resin which oxide may cause a side reaction during charge and discharge of a battery. This allows the nonaqueous electrolyte secondary battery to have an excellent cycle characteristic. For example, Examples (later later) show a high discharge capacity maintaining ratio of more than 70.0%.

The discharge capacity maintaining ratio is a ratio of (a) a discharge capacity obtained after a new nonaqueous electrolyte secondary battery that has not been subjected to a charge discharge cycle is subjected to given cycles of charge and discharge to (b) a discharge capacity obtained after that nonaqueous electrolyte secondary battery has been subjected to the first cycle of the charge and discharge. A higher discharge capacity maintaining ratio means that a battery is more excellent in cycle characteristic, i.e., a battery has a longer life. How to calculate the discharge capacity maintaining ratio will be described later in Examples.

A battery that has a discharge capacity maintaining ratio, calculated based on Equation (3) (described later in Examples), of not less than 70.0% can be said to have a sufficient cycle characteristic from the viewpoint of battery life extension.

The present invention is not limited to the embodiments, but can be altered by a skilled person in the art within the scope of the claims. An embodiment derived from a proper combination of technical means each disclosed in a different embodiment is also encompassed in the technical scope of the present invention.

EXAMPLES

The following description will more specifically discuss the present invention with reference to Examples and Comparative Example. Note, however, that the present invention is not limited to such Examples and Comparative Examples.

Method for Measuring Physical Properties Etc.

Physical properties etc. of separators and porous layers of Examples and Comparative Example were measured as below.

(1) Film Thickness (Unit: μm)

A film thickness was measured by use of a high-accuracy digital length measuring machine manufactured by Mitsutoyo Corporation.

(2) Porosity (Unit: %)

A sample in a form of an eight-centimeter square was cut out from the film, and a weight W (g) and a thickness D (cm) of the sample were measured. A volume of each material contained in the sample was calculated by calculating a weight of the each material and dividing a weight Wi (g) of the each material by an absolute specific gravity, and then a porosity is calculated based on the following equation:

Porosity (% by volume)=100−[{($W1$/absolute specific gravity 1)+($W2$/absolute specific gravity 2)+ . . . +($Wn$/absolute specific gravity $n$)}/(8× 8×$D$)]×100

(3) Weatherability Test

In conformity with JIS B 7753, test pieces obtained from porous films (separators) produced in Production Examples and Comparative Production Examples were irradiated with ultraviolet light by use of a sunshine weather meter S80 (manufactured by Suga Test Instruments Co., Ltd). Specifically, each of the test pieces was irradiated with ultraviolet light having an intensity of 255 W/m² for 75 hours by use of a sunshine carbon arc light lamp (four pairs of ultra long life carbon), which was set to have a discharge voltage of 50 V and a discharge current of 60 A, and under conditions of a black panel temperature of 60° C. and a relative humidity of 50%.

(4) Measurement of White Index (WI)

WI of the separator was measured by Specular Component Included (SCI) method (including specular reflection) by use of a spectrocolorimeter (CM-2002, manufactured by MINOLTA.). During the measurement of WI, the separator was placed on black paper (manufactured by Hokuetsu Kishu Paper Co., Ltd., colored high-quality paper, black, thickest type, shirokuhan (788 mm×1091 mm with a long side extending in a machine direction)). Then, ΔWI was calculated based on Equation (1) (described earlier) where $WI_0$ is WI measured before the separator was subjected to the weatherability test, and $WI_1$ is WI measured after the separator was subjected to the weatherability test.

(5) Discharge Capacity Maintaining Ratio

A new nonaqueous electrolyte secondary battery, which had not been subjected to a charge and discharge cycle, was subjected to three cycles of initial charge and discharge. Each of the three cycles of the initial charge and discharge was carried out at 25° C., at a voltage ranging, from 4.1 V to 2.7 V, and at an electric current value of 0.2 C. Note that a value of an electric current at which a battery rated capacity defined as a one-hour rate discharge capacity is discharged in one hour is assumed, to be 1 C. This applies also to the following descriptions. Subsequently, three cycles of charge and discharge were carried out at each of electric current values 1 C, 5 C, 10 C, and 20 C. Lastly, three cycles of charge and discharge were carried out at an electric current value of 0.2 C, and then a discharge capacity maintaining ratio after 18 cycles of charge and discharge was calculated based on the following Equation (2):

Discharge capacity maintaining ratio after 18 cycles (%)=(discharge capacity obtained in the 18th cycle at 0.2 C/discharge capacity obtained in the first cycle at 0.2 C)×100 (2)

A discharge capacity maintaining ratio after 180 cycles of charge and discharge was further calculated based on the following Equation (3):

Discharge capacity maintaining ratio after 180 cycles (%)=(discharge capacity obtained in the 18th cycle at 0.2 C/discharge capacity obtained in the first cycle at 0.2 C)$^{10}$×10 (3)

PRODUCTION EXAMPLES

Production of Separator

Production Example 1

A polyethylene powder (ultra-high molecular weight polyethylene GUR2024 manufactured by Ticona Corporation) and a low-molecular-weight polyethylene powder (polyethylene wax FNP-0115 manufactured by Nippon Seiro Co., Ltd.) having a weight-average molecular weight of 1,000 were mixed so as to obtain a resin mixture in which the polyethylene powder and the low-molecular-weight polyethylene powder were contained in respective amounts of 68% by weight and 32% by weight. Then, with 100 parts by weight of the resin mixture, 160 parts by weight of calcium carbonate (manufactured by Maruo Calcium Co., Ltd. and having an average particle size of 0.10 μm) and 3 parts by weight of an antioxidant (IRG1010 (manufactured by Ciba Specialty Chemicals Corporation):Irf168 (manufactured by Ciba Specialty Chemicals Corporation)=2 parts by weight:1 part by weight) were mixed. A resultant mixture was melt-kneaded by use of a twin screw kneading extruder at 200° C., so that a resin composition was obtained.

The resin composition was extruded from a T-die, which had been set at 240° C., so as to be sheet-shaped. Then, the resin composition was rolled by a pair of rollers having a surface temperature of 150° C., so that a sheet of the resin composition was prepared. An air exposure time in which the resin composition was extruded from the T-die and then cooled by the rollers (i.e., a period in which the resin composition was extruded from the T-die and then brought into contact with the rollers) was 3.6 seconds. Note that in all Production Examples and Comparative Production Examples, an identical extrusion machine was used and a distance (corresponding to the distance 4 illustrated in FIG. 1) between the T-die and the rollers was 15 cm.

The sheet thus prepared was immersed in an aqueous hydrochloric acid solution (containing 4 mol/L of hydrochloric acid and 1% by weight of a non-ionic surfactant (SANMORIN 11 manufactured by Sanyo Chemical Industries, Ltd.)) at 40° C., so that calcium carbonate was removed. Then, the sheet was stretched sixfold at 100° C. by use of a tenter uniaxial stretching machine manufactured by Ichikin Co., Ltd. so that a separator 1, which is a polyolefin porous film, was obtained.

Production Example 2

A polyethylene powder (ultra-high molecular weight polyethylene GUR4032 manufactured by Ticona Corporation) and a low-molecular-weight polyethylene powder (polyethylene wax FNP-0115 manufactured by Nippon Seiro Co., Ltd.) were mixed so as to obtain a resin mixture in which the polyethylene powder and the low-molecular-weight polyethylene powder were contained in respective amounts of 70% by weight and 30% by weight. Then, with 100 parts by weight of the resin mixture, 160 parts by weight of calcium carbonate (manufactured by Maruo Calcium Co., Ltd. and having an average particle size of 0.10 μm) and 3 parts by weight of an antioxidant (IRG1010:Irf168=2 parts by weight:1 part by weight) were mixed. A resultant mixture was melt-kneaded by use of a twin screw kneading extruder at 200° C., so that a resin composition was obtained.

The resin composition was extruded from a T-die, which had been set at 247° C., so as to be sheet-shaped. Then, the resin composition was rolled by a pair of rollers having a surface temperature of 150° C., so that a sheet of the resin composition was prepared. An air exposure time in which the resin composition was extruded from the T-die and then cooled by the rollers was 3.0 seconds.

The sheet thus prepared was immersed in an aqueous hydrochloric acid solution (containing 4 mol/L of hydrochloric acid and 6% by weight of a non-ionic surfactant) 40° C., so that calcium carbonate was removed. Then, the sheet was stretched sixfold at 105° C. by use of a tenter uniaxial stretching machine manufactured by Ichikin Co., Ltd. so that a separator 2, which is a polyolefin porous film, was obtained.

Comparative Production Example 1

A polyethylene powder (ultra-high molecular weight polyethylene GUR4032 manufactured by Ticona Corporation) and a low-molecular-weight polyethylene powder (polyethylene wax FNP-0115 manufactured by Nippon Seiro Co., Ltd.) were mixed so as to obtain a resin mixture in which the polyethylene powder and the low-molecular-weight polyethylene powder were contained in respective amounts of 71% by weight and 29% by weight. Then, with 100 parts by weight of the resin mixture, 160 parts by weight of calcium carbonate (manufactured by Maruo Calcium Co., Ltd. and having an average particle size of 0.10 μm) and 3 parts by weight of an antioxidant (IRG1010:Irf168=2 parts by weight:1 part by weight) were mixed. A resultant mixture was melt-kneaded by use of a twin screw kneading extruder at 200° C., so that a resin composition was obtained.

The resin composition was extruded from a T-die, which had been set at 253° C., so as to be sheet-shaped. Then, the resin composition was rolled by a pair of rollers having a surface temperature of 150° C., so that a sheet of the resin composition was prepared. An air exposure time in which the resin composition was extruded from the T-die and then cooled by the rollers was 2.3 seconds.

The sheet thus prepared was immersed in an aqueous hydrochloric acid solution (containing 4 mol/L of hydrochloric acid and 1% by weight of non-ionic surfactant) at 40° C., so that calcium carbonate was removed. Then, the sheet was stretched sevenfold at 100° C. by use of a tenter uniaxial stretching machine manufactured by Ichikin Co., Ltd. so that a separator 1 for comparison (hereinafter referred to as a "comparative separator 1"), which is a polyolefin porous film, was obtained.

Comparative Production Example 2

A polyethylene powder (ultra-high molecular weight polyethylene GUR4032 manufactured by Ticona Corporation) and a low-molecular-weight polyethylene powder (polyethylene wax FNP-0115 manufactured by Nippon Seiro Co., Ltd.) were mixed so as to obtain a resin mixture in which the polyethylene powder and the low-molecular-weight polyethylene powder were contained in respective amounts of 70% by weight and 30% by weight. Then, with 100 parts by weight of the resin mixture, 160 parts by weight of calcium carbonate (manufactured by Maruo Calcium Co., Ltd. and having an average particle size of 0.10 μm) and 3 parts by weight of an antioxidant (IRG1010:Irf168=2 parts by weight:1 part by weight) were mixed. A resultant mixture was melt-kneaded by use of a twin screw kneading extruder at 200° C., so that a resin composition was obtained.

The resin composition was extruded from a T-die, which had been set at 252° C., so as to be sheet-shaped. Then, the resin composition was rolled by a pair of rollers having a surface temperature of 150° C., so that a sheet of the resin composition was prepared. An air exposure time in which the resin composition was extruded from the T-die and then cooled by the rollers was 3.6 seconds.

The sheet thus prepared was immersed in an aqueous hydrochloric acid solution (containing 4 mol/L of hydrochloric acid and 6% by weight of non-ionic surfactant) at 40° C., so that calcium carbonate was removed. Then, the sheet was stretched sixfold at 105° C. by use of a tenter uniaxial stretching machine manufactured by Ichikin Co., Ltd. so that a separator 2 for comparison (hereinafter referred to as a "comparative separator 2"), which is a polyolefin porous film, was obtained.

Preparation of Nonaqueous Electrolyte Secondary Battery

Next, nonaqueous electrolyte secondary batteries were produced by the following method by use of the separators 1 and 2, which were prepared in respective Production Examples, and the comparative separators 1 and 2, which were prepared in respective Comparative Production Examples.

Cathode

A commercially-available cathode produced by applying, to aluminum foil, a mixture of 92 parts by weight of $LiNi_{0.5}Mn_{0.3}Co_{0.2}O_2$, which is a cathode active material, 5 parts by weight of an electrically conductive material, and 3 parts by weight of polyvinylidene fluoride (PVDF) was used to prepare a nonaqueous electrolyte secondary battery. The aluminum foil was cut out so that a first part of the aluminum foil in which first part no cathode active material layer was provided and which first part had a width of 13 mm was left around a second part of the aluminum foil in which second part a cathode active material layer was provided and which second part had a size of 40 mm×35 mm. A cathode was thus obtained. The cathode active material layer had a thickness of 58 μm and a density of 2.50 g/cm³.

Anode

A commercially-available anode produced by applying, to a copper foil, a mixture of 98 parts by weight of graphite, which is an anode active material, 1 parts by weight of a styrene-1,3-butadiene copolymer, and 1 parts by weigh of carboxymethyl cellulose sodium was used to prepare a nonaqueous electrolyte secondary battery. The copper foil of the anode was cut so that a first part of the copper foil in which first part no anode active material layer was provided and which first part had a width of 13 mm was left around a second part of the copper foil in which second part an anode active material layer was provided and which second part had a size of 50 mm×40 mm. An anode was thus obtained. The anode active material layer had a thickness of 49 μm and a density of 1.40 g/cm³.

Assembly

The cathode, the separator (separator 1 or 2, or comparative separator 1 or 2), and the anode were laminated (provided) in this order in a laminate pouch, so that a nonaqueous electrolyte secondary battery member was obtained. In this case, the cathode and the anode were positioned so that a whole of a main surface of the cathode active material layer of the cathode was included in a range of a main surface (overlapped the main surface) of the anode active material layer of the anode.

Subsequently, the nonaqueous electrolyte secondary battery member was placed in a bag obtained by laminating an aluminum layer and a heat seal layer, and 0.25 mL of a nonaqueous electrolyte was poured into the bag. The nonaqueous electrolyte was an electrolyte having a temperature of 25° C. and obtained by dissolving $LiPF_6$ having a concentration of 1.0 mole per liter in a mixed solvent of ethyl methyl carbonate, diethyl carbonate, and ethylene carbonate in a volume ratio of 50:20:30. Then, the bag was heat-sealed while being decompressed, so that nonaqueous electrolyte secondary batteries 1 and 2, which include the respective separators 1 and 2, and comparative nonaqueous electrolyte secondary batteries 1 and 2, which include the respective comparative separators 1 and 2, were prepared.

Examples 1 and 2 and Comparative Examples 1 and 2

In Examples 1 and 2, discharge capacity maintaining ratios after 180 cycles of the nonaqueous electrolyte secondary batteries 1 and 2, which include the respective separators 1 and 2, were calculated. In Comparative Examples 1 and 2, discharge capacity maintaining ratios after 180 cycles of the comparative nonaqueous electrolyte secondary batteries 1 and 2, which include the respective comparative separators 1 and 2, were calculated. Table 1 shows results of the calculations.

Extrusion Temperature, Air Exposure Time, and Surfactant Concentration, each of which is shown in Table 1, are conditions under which to produce each of the separators used in respective Examples and Comparative Examples, and are described in Production Examples (described earlier) and Comparative Production Examples (described earlier). "Surfactant Concentration" shown in Table 1 refers to a concentration of a non-ionic surfactant contained in the aqueous hydrochloric acid solution.

Film thickness, Porosity, and ΔWI, each of which is shown in Table 1, refer to a film thickness, a porosity, and ΔWI, respectively, of each of the separators used in Examples and Comparative Examples.

As shown in Table 1, it is revealed that the nonaqueous electrolyte secondary batteries 1 and 2, which include the respective separators 1 and 2 each having ΔWI of not more than 2.5, each had a discharge capacity maintaining ratio after 180 cycles of more than 70.0%, i.e., had a high cycle characteristic. In contrast, the comparative nonaqueous electrolyte secondary batteries 1 and 2, which include the respective comparative separators 1 and 2 each having ΔWI of more than 2.5, each had a discharge capacity maintaining ratio of less than 70.0%. From the viewpoint of battery life extension, a nonaqueous electrolyte secondary battery which has a discharge capacity maintaining ratio of less than 70.0% can be said to have an insufficient cycle characteristic.

As shown in Table 1, the resin was extruded from the T-die at extrusion temperatures of 240° C. and 247° C. in respective Examples 1 and 2, whereas the resin was extruded from the T-die at extrusion temperatures of 253° C. and 252° C. in respective Comparative Examples 1 and 2.

As described earlier, since Examples 1 and 2 each used a separator obtained from a resin that had been exposed to air at a temperature lower than a temperature at which a resin used in each of Comparative Examples 1 and 2 had been exposed to air, the separators 1 and 2 each had ΔWI of not more than 2.5. Thus, the nonaqueous electrolyte secondary batteries 1 and 2 are considered to have had an excellent cycle characteristic.

In each of Comparative Production Examples 1 and 2, the extrusion temperature exceeded 250° C. Thus, it is considered that an oxide contained in a resin increased in amount in a period in which the resin was extruded and then brought into contact with the rollers, and a resultant separator had ΔWI of more than 2.5, so that the comparative nonaqueous electrolyte secondary batteries 1 and 2 each including the resultant separator had an insufficient discharge capacity maintaining ratio of less than 70.0%.

Comparative Production Example 1, in which the air exposure time was 2.3 seconds, was the shortest in air exposure time of all Production Examples and Comparative Production Examples. Note, however, that the extrusion temperature was 253° C. in Comparative Production Example 1. Thus, it is considered that an influence of a high extrusion temperature of higher than 250° C. was greater than an advantage brought by a short air exposure time.

As proved by Examples, it is knowledge found by the present invention for the first time that a nonaqueous electrolyte secondary battery having a high cycle characteristic can be obtained by using a separator having ΔWI of not more than 2.5. Thus, the present invention can be said to be extremely useful as an invention that makes it possible to provide a nonaqueous electrolyte secondary battery that can sufficiently meet a demand for battery life extension.

INDUSTRIAL APPLICABILITY

The present invention is widely applicable to industrial fields in each of which a nonaqueous electrolyte secondary

TABLE 1

|  | Extrusion Temperature (° C.) | Air Exposure Time (Sec) | Surfactant Concentration (wt %) | Film Thickness (μm) | Porosity (%) | ΔWI | Discharge Capacity Maintaining Ratio After 180 Cycles (%) |
|---|---|---|---|---|---|---|---|
| Example 1 | 240 | 3.6 | 1 | 11 | 37 | 2.19 | 70.7 |
| Example 2 | 247 | 3.0 | 6 | 16 | 52 | 2.16 | 70.9 |
| Comparative Example 1 | 253 | 2.3 | 1 | 12 | 50 | 3.26 | 69.4 |
| Comparative Example 2 | 252 | 3.6 | 6 | 16 | 65 | 2.79 | 67.8 | battery is used, e.g., fields of a personal computer, a mobile phone, and a portable information terminal.

REFERENCE SIGNS LIST

1 Resin
2 T-die

3 Roller
4 Distance between T-die and roller

The invention claimed is:

1. A method for producing a nonaqueous electrolyte secondary battery separator comprising a porous film containing a polyolefin-based resin as a main component, the method comprising the steps of:

extruding a resin from an outlet of an extrusion machine; and causing a pair of rollers to roll the resin so as to form the resin into a thin film, the resin being extruded from the outlet at a temperature of not lower than 200° C. and not higher than 250° C., and the resin being exposed to air for not longer than 3.6 seconds after being extruded from the outlet and then brought into contact with the pair of rollers, the nonaqueous electrolyte secondary battery separator having ΔWI defined by the following Equation (1) of not more than 2.5:

$$\Delta WI = WI_1 - WI_0 \qquad \text{Equation (1)}$$

wherein WI is a white index defined by American Standard Test Method (ASTM) E313; $WI_0$ is WI that is measured, by use of a spectrocolorimeter, on a surface of the porous film which has not been irradiated with ultraviolet light having 255 W/m²; and $WI_1$ is WI that is measured, by use of the spectrocolorimeter, on the surface of the porous film which has been irradiated, for 75 hours, with the ultraviolet light having 255 W/m².

2. The method as set forth in claim 1, wherein the resin is extruded from the outlet at an extrusion speed of 1 m/min to 10 m/min.

3. The method as set forth in claim 1, wherein the pair of rollers has a surface temperature of 120° C. to 160° C.

4. The method as set forth in claim 1, further comprising a step of allowing a sheet that has been formed by being rolled by the pair of rollers to pass through a cleaning liquid containing a surfactant, and removing a pore forming agent from the sheet.

5. The method as set forth in claim 4, wherein the surfactant is a non-ionic surfactant.

6. The method as set forth in claim 4, wherein the surfactant is contained in the cleaning liquid in an amount of not less than 0.1% by weight and not more than 15% by weight.

7. The method as set forth in claim 4, wherein the cleaning liquid has a temperature of not lower than 25° C. and not higher than 60° C.

8. The method as set forth in claim 4, further comprising a step of further cleaning, with water, the sheet from which the pore forming agent has been removed.

9. A method for producing a nonaqueous electrolyte secondary battery laminated separator, comprising a step of applying a coating solution containing a resin to the nonaqueous electrolyte secondary battery separator obtained by a method recited in claim 1.

10. The method as set forth in claim 9, wherein the resin contains aromatic polyamide.

* * * * *